US006543168B1

(12) United States Patent
Moore

(10) Patent No.: US 6,543,168 B1
(45) Date of Patent: Apr. 8, 2003

(54) COMPUTER MONITOR PICTURE FRAME

(76) Inventor: James G. Moore, 63 Crescent St., Duxbury, MA (US) 02332

( * ) Notice: Subject to any disclaimer, the term of this patent is extended or adjusted under 35 U.S.C. 154(b) by 0 days.

(21) Appl. No.: 09/960,505

(22) Filed: Sep. 24, 2001

(51) Int. Cl.$^7$ ................................................. A47G 1/16
(52) U.S. Cl. ........................... 40/747; 40/725; 40/757; 40/762; 40/765
(58) Field of Search .................... 40/725, 747, 757, 40/762, 765, 776; 248/479, 918

(56) References Cited

U.S. PATENT DOCUMENTS

| | | | | | |
|---|---|---|---|---|---|
| 4,025,015 A | * | 5/1977 | Kolic | ................. | 128/DIG. 26 |
| 4,624,067 A | * | 11/1986 | Kristofich | ................. | 40/762 |
| 4,693,443 A | * | 9/1987 | Drain | ................. | 211/89.01 |
| 4,776,116 A | * | 10/1988 | Shuman | ................. | 40/493 |
| 4,939,858 A | * | 7/1990 | Dailey | ................. | 40/732 |
| 5,408,774 A | * | 4/1995 | Grewe et al. | ................. | 248/349.1 |
| 5,433,036 A | * | 7/1995 | Ganal | ................. | 40/729 |
| 5,505,421 A | * | 4/1996 | Marthaler | ................. | 248/442.2 |
| 5,890,309 A | * | 4/1999 | Markarian | ................. | 40/605 |
| 5,901,937 A | * | 5/1999 | Compeau et al. | ................. | 248/205.1 |
| 6,163,997 A | * | 12/2000 | Deralas | ................. | 40/593 |
| D447,750 S | * | 9/2001 | Bell | ................. | D14/448 |

* cited by examiner

Primary Examiner—Brian K. Green
(74) Attorney, Agent, or Firm—John P. McGonagle

(57) ABSTRACT

An adjustable mirror frame removably attachable to a computer monitor. The frame has a base attachable to a computer monitor and a mirror frame removably attachable to the base in any one of three positions. The mirror frame may be pivoted about the base to provide a desired picture frame position relative to the base and computer monitor.

7 Claims, 1 Drawing Sheet

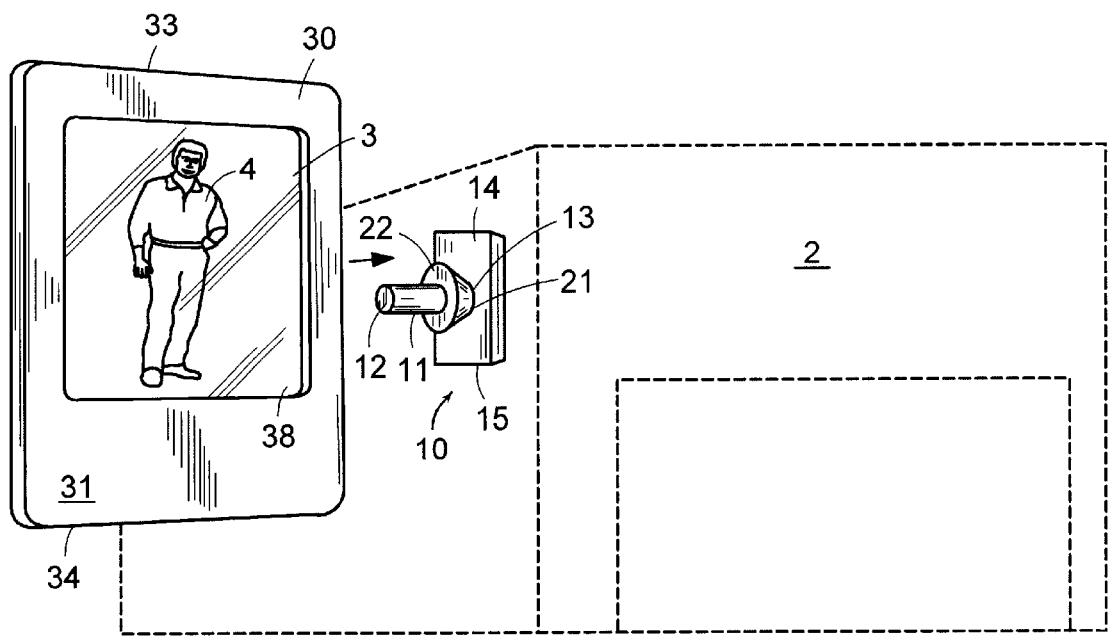
FIG. 1
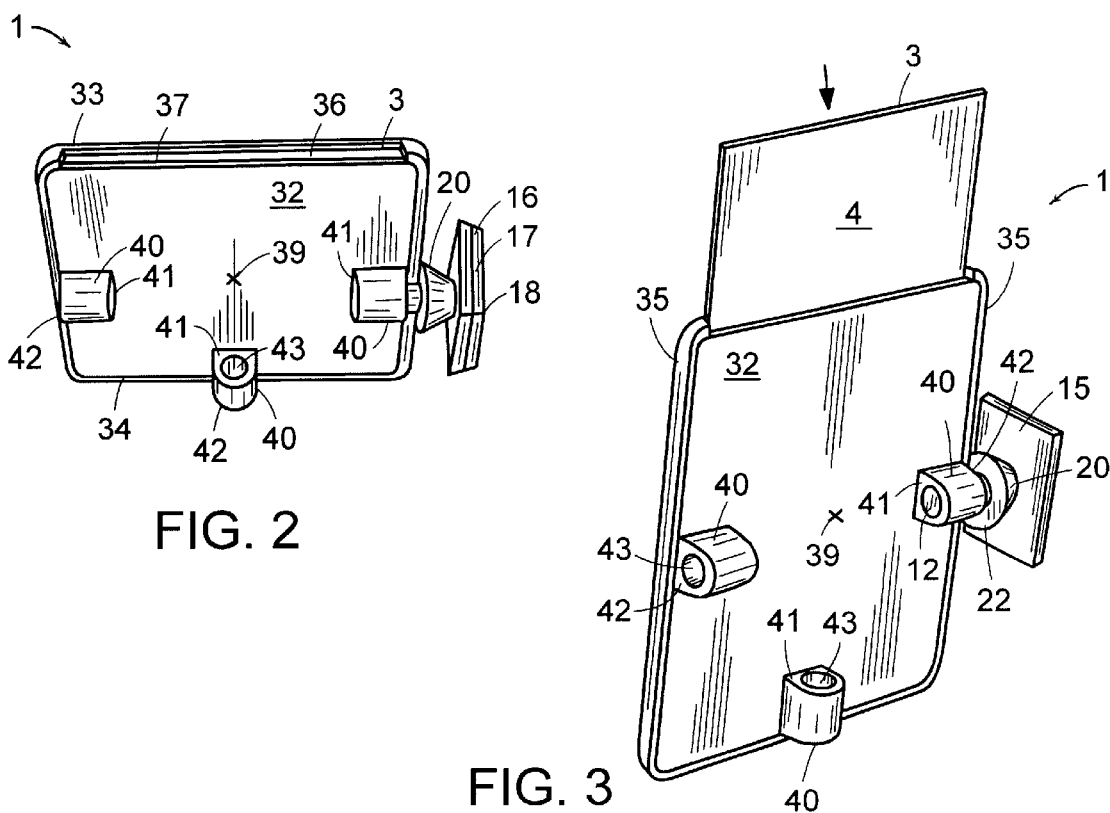
FIG. 2
FIG. 3

COMPUTER MONITOR PICTURE FRAME

BACKGROUND OF THE INVENTION

This invention relates to picture frames, and in particular to a picture frame attachable to a computer monitor.

Computers are used extensively in the work place in association with many tasks. Because of this, office and work spaces are being modified to orient about the computers being used. In previous work environments workers were able to personalized their work spaces with pictures and the like resting on a flat work surface or hanging on a nearby wall. Because of the focus on a worker's computer and especially the computer's monitor, current work environments do not always have readily available flat work surfaces or nearby walls adapted to receive pictures and the like.

Since a worker's productivity rises in a more personalized work environment, it is desirable to provide a means for a worker to personalized his or her work space in a computer oriented work environment

SUMMARY OF THE INVENTION

In view of the foregoing, it is the primary object of the present invention to provide an adjustable mirror frame removably attachable to a computer mirror. The present invention provides a base attachable to a computer monitor and a mirror frame removably attachable to the base in any one of three positions. The mirror frame may be pivoted about the base to provide a desired picture frame position relative to the base and computer monitor.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 is a front view of the invention detached from its base.

FIG. 2 is a rear perspective view of the invention.

FIG. 3 is a rear perspective view of another embodiment of the invention.

DETAILED DESCRIPTION OF THE INVENTION

Referring to the drawings in detail wherein like elements are indicated by like numerals, there is shown a computer monitor picture frame 1 constructed according to the principles of the present invention. The invention 1 is comprised of a picture frame 30 attachable to a base 10. The base 10 is attachable to a computer monitor 2 or any other type of surface whether vertical, horizontal or oblique.

The base 10 is comprised of an elongated, cylindrical member 11 with two ends, one end a free end 12 and the other end 13 terminating in a generally flat member 14. The elongated member ends 12, 13 define its longitudinal axis. The elongated member longitudinal axis is perpendicular to the plane of the flat member 14. The flat member 14 has two surfaces, a first surface 15 joined to the elongated member 11, and a second, opposite surface 16 to which an adhesive coating 17 is attached. In this embodiment of the invention a section of paper 18 removably covers the adhesive coating 17. An inverted frustum section 20 is formed about the elongated element terminating end 13. The frustum section "top" 21 abuts the flat member first surface 15. The frustum section "base" 22 lies in a radial plane parallel coincident with the radial axis of the elongated member 11. The frustum section 20 has a central axis defining a central length, said central length being defined by the frustum section's top 21 and base 22. The central length of the frustum section 20 in this embodiment of the invention is approximately one-third of the length of the elongated member 11 along the elongated member's central, longitudinal axis.

The picture frame 30 has a generally rectangular shape, and has a front surface 31, a rear surface 32, a top 33, a bottom 34 and two sides 35. The picture frame 30 has a generally rectangular interior cavity 36. The top 33 has an elongated, open channel 37 formed therein opening into the frame interior 36. The frame front surface 31 has a substantial rectangular aperture 38 formed therein, said aperture 38 opening into the frame interior 36. A thin, transparent, sheet-like element 3 having length and width dimensions slightly less than the length and width dimensions of the interior cavity 36 is inserted into the interior cavity 36 through the top channel 37. A picture 4 may then be inserted into the frame interior 36 behind the transparent sheet 3 so that the sheet 3 is between the picture 4 and the front surface aperture 38. The transparent sheet 3 may be made from transparent plastic, glass or other desired transparent material.

The frame rear surface 32 has three partial ring-like elements 40 fixedly attached thereto. The elements 40 are positioned one at each side 35 midpoint and one at the bottom 34 midpoint. Each element 40 has a generally flat proximal end 41 and a generally flat distal end 42. The proximal ends 41 are the element ends closest to a center point 39 on the rear surface 32.

The distal ends 42 abut either the sides 35 or the bottom 34. The partial ring-like elements 40 each have a cylindrical interior aperture 43 formed therein, said apertures 43 opening onto the element proximal 41 and distal 42 ends. The apertures 43 each have a radial diameter slightly greater than the diameter, of the base elongated member 11.

In operation, the base 10 is attached to a computer monitor 2 or other desired surface. The picture frame 30 is attached to the base 10 by manipulating any one of the rounded element apertures 43 onto the base elongated member 11 over the elongated base member free end 12. The frustum base 22 provides a "stop" for the frame 30 against the base 10. The picture frame 30 may be adjusted by twisting the frame rounded element 40 about the base elongated member 11.

It is understood that the above-described embodiments are merely illustrative of the application. Other embodiments may be readily devised by those skilled in the art which will embody the principles of the invention and fall within the spirit and scope thereof.

I claim:

1. A computer monitor picture frame, comprising:
   a base attachable to a computer monitor wherein the base is comprised of:
   a generally flat member having a first surface and a second surface to which an adhesive coating is attached; and
   an elongated, cylindrical member with two ends, one end a free end and the other end terminating in said flat member first surface, said elongated member ends defining an elongated member longitudinal axis, said elongated member longitudinal axis being perpendicular to the flat member first surface; and a generally rectangular picture frame attachable to said base, wherein said picture frame is comprised of a front surface, a rear surface, a top, a bottom, two sides, and a generally rectangular interior cavity, said top having an elongated, open channel formed therein opening into the frame interior cavity, said frame front surface having a substantial rectangular aperture formed therein, said aperture opening into the frame interior cavity;

a thin, transparent, sheet-like element having length and width dimensions slightly less than the length and width dimensions of the interior cavity inserted into the interior cavity through the top channel;

wherein said frame rear surface has three partial ring-like elements fixedly attached thereto, said elements each being positioned at a side midpoint and one at a bottom midpoint, each element having a generally flat proximal end and a generally flat distal end, said proximal ends being the element ends closest to a rear surface center point, said distal ends adjacent either the sides or the bottom, each element having a cylindrical interior aperture formed therein, said apertures opening onto the element proximal and distal ends, said apertures each have a radial diameter slightly greater than the diameter of the base elongated member.

2. A computer monitor picture frame as recited in claim 1, wherein:

said base flat member second surface is attachable to a computer monitor or other desired surface;

said picture frame is adapted to being attached to the base by manipulation of a said ring-like element cylindrical interior aperture onto the base elongated member over the elongated base member free end.

3. A computer monitor picture frame as recited in claim 2, further comprising:

an inverted frustum section having a base and a top is formed about the elongated member terminating end, said frustum section top abutting the flat member first surface, and said frustum section base lying in a radial plane parallel coincident with the radial axis of the elongated member, said frustum section having a central axis defining a central length, said central length being defined by the frustum section's top and base, said central length of the frustum section being a portion of the length of the elongated member along the elongated member's central, longitudinal axis, wherein the frustum base provides a stop for the frame against the picture frame base.

4. A computer monitor picture frame as recited in claim 3, further comprising:

a section of material removably covering said adhesive coating.

5. A computer monitor picture frame as recited in claim 4, wherein:

the picture frame is adapted to having a picture inserted into the frame interior through the top channel behind the transparent sheet wherein the sheet is between the picture and the front surface aperture.

6. A computer monitor picture frame as recited in claim 5, wherein:

said transparent sheet is transparent plastic.

7. A computer monitor picture frame as recited in claim 6, wherein:

said picture frame is adapted to being adjusted by twisting the frame about the base elongated member.

* * * * *